(No Model.)

P. C. BURNS.
ELECTRIC BATTERY CELL.

No. 514,845. Patented Feb. 13, 1894.

WITNESSES:
Frank S. Oden
C. L. Belcher

INVENTOR,
Peter C. Burns,
BY
G. H. Stockbridge
his ATTORNEY.

THE NATIONAL LITHOGRAPHING COMPANY,
WASHINGTON, D. C.

UNITED STATES PATENT OFFICE.

PETER C. BURNS, OF PERU, INDIANA.

ELECTRIC-BATTERY CELL.

SPECIFICATION forming part of Letters Patent No. 514,845, dated February 13, 1894.

Application filed June 12, 1893. Serial No. 477,395. (No model.)

*To all whom it may concern:*

Be it known that I, PETER C. BURNS, a citizen of the United States, residing at Peru, in the county of Miami and State of Indiana, have invented certain new and useful Improvements in Electric-Battery Cells; and I do hereby declare the following to be a full, clear, and exact description of the invention, such as will enable others skilled in the art to which it appertains to make and use the same.

My invention relates to electric batteries, and, more especially, to the batteries of the zinc carbon type.

One of the objects of my invention is to provide simple means for keeping the carbon electrode off the bottom of the jar, such means being designed to take the place of the troublesome rubber bands which are now employed for the purpose mentioned.

A second object of my invention is to provide means whereby the carbon and the zinc may be readily insulated from each other within the cell, without resort to the rubber bands now very generally employed for securing the insulation.

Another detail of my invention concerns itself with furnishing a substitute for the ordinary zinc binding-post, such substitute being formed by cutting out a piece of the zinc electrode itself, and attaching it to the electrode, and forming the binding-post from the cut away portion, or else in slitting the zinc electrode, and then turning up the strip thus formed, and making a binding-post out of it.

My invention will be fully understood by referring to the accompanying drawings, in which—

Figure 1:
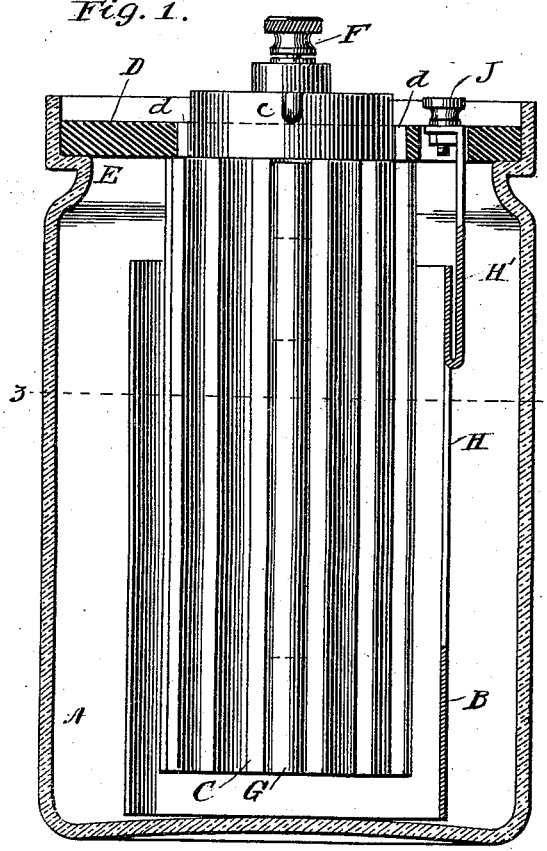
Figure 2:
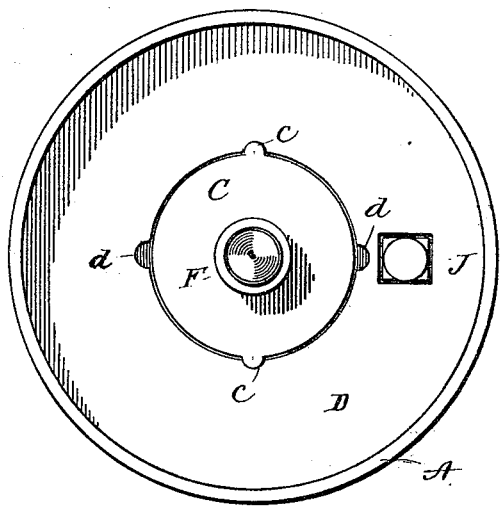

Figure 1, is a vertical section of a battery jar or cell, embodying my invention. Fig. 2, is a plan of the same; and Fig. 3, is a cross section along the line 3—3, in Fig. 1, looking upward.

Referring to the drawings by letter, A, is a battery jar, within which are contained the zinc electrode, B, and the carbon electrode, C. At the top of the jar is shown a plate, D, of porcelain, which is adapted to rest upon a ledge, E, formed within the mouth of the jar. The plate, D, practically forms a cover for the jar, and through it project the binding-posts for the two elements of the cell. The carbon element passes up through the middle of the plate D, and has a binding-post, F, upon its top. It is also provided with lugs, c, c, which project over the edge of the central opening in the plate, D, but are just able to pass up through grooves, d, d, made at opposite sides of the said central opening. The practice is to pull the carbon up through the central opening, first bringing the lugs, c, c, into alignment with the grooves, d, d, and then give the carbon electrode a partial turn or rotation, leaving the said electrode supported by the lugs, c, c, resting on the plate, D. In this way, the bottom of the carbon is held off the floor of the jar, as will be readily understood. This feature of my invention may be applied to carbons either smooth or corrugated, and either plain or provided with some depolarizing substance.

Figure 3:
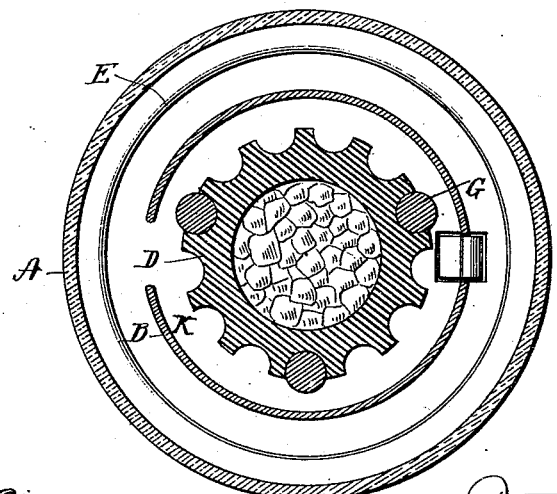

I have illustrated in the drawings a corrugated carbon, and in Fig. 3, I have shown certain of the corrugations, one hundred and twenty degrees apart, as being made a little deeper and more rounding than the others, to receive plugs or pencils of insulating material G, such as soft rubber, which may be inserted either by pushing in from the end of the corrugations, or pressing in from the sides. The corrugations formed as described do not need to be one hundred and twenty degrees apart, nor to be limited in number to three. The number may be made as great or as small as may be found efficient for producing the result desired. Moreover, the specially formed corrugations may either extend along the entire length of the corrugated portion of the carbon, or there may be short portions, specially formed in the way described, either at the ends or the middle of the corrugated portion. A method which I like to use is that of having short deepened and rounded corrugations, one hundred and twenty degrees apart at one end of the corrugated portion of the carbon, and other deepened and rounded corrugations at the other end, the said specially formed corrugations being also one hundred and twenty degrees apart, but alternating with the corrugations first mentioned. In any case, the object of securing good insulation between the carbon and the zinc is the main object sought, and any arrangement which accomplishes this is sufficient for my purpose.

At H, in Fig. 1, is an opening in the zinc, B, where a strip of the zinc has been cut and turned up, the turned-up portion being shown at H'. At the top, the said turned-up portion, H', is bent, so as to form a horizontal seat for a binding-screw, J. The portion, H', being thin, I reinforce it by placing an angular nut under the bent-over portion at the top, letting the said nut, or one of its sides, rest against the vertical part of the strip, H', and then screwing in the binding-screw, J, while the nut is in its place. In this way, a simple binding device is formed on the zinc element, a strip of the said element itself being the principal portion of the said binding device. The cutting away of a small strip of the zinc does not affect injuriously the action of the battery cell, the portion so taken being inconsiderable. Instead of turning the cut strip upward, and so forming the binding-post, I may cut the strip entirely off and rivet it, or otherwise secure it, to the top of the zinc element, the construction in other respects being the same as that already detailed.

It will be seen that I have shown in Fig. 3, a hollow carbon, filled with a depolarizer K, such as coke, ground carbon, or manganese. It is, of course, a matter of indifference, so far as my present invention is concerned, whether the carbon is hollow or solid. It is, in fact, also indifferent whether the carbon is corrugated around its entire surface, the only essential being that there should be certain indentations or depressions (whether properly called corrugations or not) in which the plugs or pencils of insulating material may be inserted.

It will be understood that the grooves or depressions in the carbon element need not be in the form of corrugations; they may be simply holes adapted to be filled with plugs or pencils which will project beyond the outer surface of the carbon element.

What I claim is—

1. In an electric battery cell, a carbon element having grooves or depressions in which are plugs or pencils of insulating material projecting beyond the surface of the said carbon element, as and for the purpose set forth.

2. In an electric battery cell, a carbon element, and a zinc element surrounding the same, the said carbon element being provided with grooves or depressions in which are plugs or pencils of insulating material projecting beyond the surface of the said carbon element, as and for the purpose set forth.

3. In an electric battery cell, a zinc element, and a carbon element within the same, the said carbon element being corrugated longitudinally and having certain corrugations, or parts thereof, formed deep and rounding, the said deepened and rounded corrugations having in them plugs or pencils of insulating material, as and for the purpose set forth.

4. In an electric battery cell, a carbon element provided with grooves or depressions, and soft rubber plugs in the said grooves or depressions, the said plugs projecting beyond the surface of the carbon element, as and for the purpose set forth.

5. In an electric battery cell, a zinc element having a strip cut away, the said strip being attached to the said zinc element, and being bent over at the top and re-inforced by an angular nut, the said bent-over and re-inforced portion being traversed by a binding-screw, the said binding-screw being supported solely, by the said bent-over portion and the re-inforcing nut, as and for the purpose set forth.

In testimony whereof I have signed my name, in the presence of two witnesses, this 6th day of June, A. D. 1893.

PETER C. BURNS.

Witnesses:
HARRY C. McKINLEY,
BEN. J. TURPIN.